Figure 1:
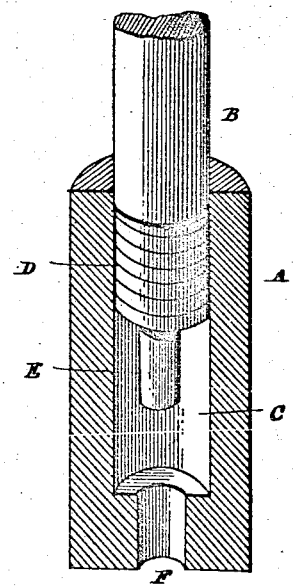

(No Model.)

A. J. UPHAM.
MAKING METALLIC TUBES.

No. 370,832.  Patented Oct. 4, 1887.

WITNESSES
Edwin L. Yewell.
Wm F. Hintemann.

INVENTOR
Andrew J Upham
by Manahan & Ward
his Attorney

UNITED STATES PATENT OFFICE.

ANDREW J. UPHAM, OF SYCAMORE, ILLINOIS, ASSIGNOR OF ONE-HALF TO JOSEPH B. STEPHENS, OF SAME PLACE.

MAKING METALLIC TUBES.

SPECIFICATION forming part of Letters Patent No. 370,832, dated October 4, 1887.

Application filed June 6, 1887. Serial No. 240,477. (No model.)

*To all whom it may concern:*

Be it known that I, ANDREW J. UPHAM, a citizen of the United States, residing at Sycamore, in the county of De Kalb and State of Illinois, have invented certain new and useful Improvements in Making Metallic Tubes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this this specification.

My invention has reference to making metallic tubes or hollow metallic shafts of spirally-coiled metallic rods or strips; and it consists both in the means employed for the production of said tubes and in the process involved in said manufacture.

As is well known in the art, the better class of gun-barrels in which the maximum of lateral strength is attempted to be combined with the minimum of metal, and therefore lightness of parts, it has been customary to construct the gun-barrels of spirally-coiled strips of metal welded at the contiguous edges, and afterward bore the tube thus formed internally, and turn it off externally to the desired size and form. The advantage of this form of structure is that the strain, which is mainly lateral, is in the direction of the length of the fiber of the material, or, as it is usually termed, the "grain." There are various uses to which this principle could be advantageously applied were the process of manufacture less expensive and more certain to ensue in uniform results throughout the entire mass. The mode heretofore adopted has been to form the strips of iron or steel, with oblique or beveled edges, wind them around a core or former of a diameter slightly less than the intended bore of the desired tube, heat a portion of the spiral coil to a welding heat, and then, by inserting a mandrel through the center of the coil, weld the edges of one coil upon the other by blows by hand or otherwise from the outside toward the mandrel. As the coil became cool it was reheated and the process thus continued by installments until a coil of sufficient length had been welded. It is obvious that in this mode, aside from the expense and the delay, the process involved the successive reheating of the entire mass; also, as the metal began a continuous and progressive cooling as soon as taken from the fire, the edge undergoing welding would be cooler than the next preceding one, so that the differents joints were not welded at the same temperature; also, the pressure from the blow being perpendicular to the mandrel and the resistance of the mandrel being at the inner wall of the coil, the pressure exerted by both the blow and the resistance thereto by the mandrel would mainly affect the internal and external surfaces of the wall of the tube, while that part of the interstices between the spirals which was at or near the transverse center of the walls thereof would receive little, or at least correspondingly less pressure, so that the welding force, as well as the heat, was not uniform throughout the mass to be operated upon. It was also impracticable to thus weld walls of any considerable thickness, as the influence of the external blows would extend but slightly below the surface.

In my invention I expect to obviate all of these objections and to be able to produce a tube or band at comparatively little expense, and which shall be welded throughout its entire length at one operation in a very brief space of time, and therefore at a uniform heat throughout its entire length. In my invention, also, the welding force is exerted and distributed uniformly over all of the sides of the coil and every part thereof, so that an organic union is established throughout every part of the finished tube, and this is the case as much within the center of said walls as upon their interior and exterior surfaces.

As the preliminary coiling and heating of the spiral to be welded can be accomplished in various modes, and as my invention has more special reference to the subsequent or latter part of the process—to wit, the act of welding—I do not deem it necessary to show or describe any part of the mechanism or process except that portion thereof involved in the welding together of the adjacent walls of the spiral coil after the latter has been brought to a welding heat in any suitable mode.

Figure 2:
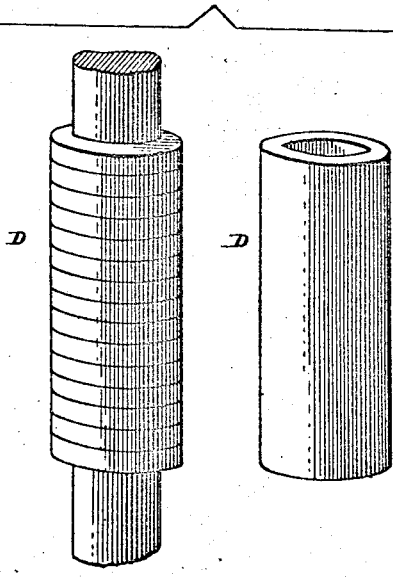

In the drawings, Figure 1 is a vertical section of the case A, within which the welding is accomplished and exhibits a plunger or follower, B, partially inserted within the chamber C, formed longitudinally in the interior of said case. Fig. 2 exhibits the spiral coil D before and after welding has been accomplished.

It will be noticed that the main tube of the plunger is adapted to loosely fit the chamber C in the case A, and upon the inner end of the plunger B there is formed a projection, E, around which is coiled a spiral, D, and that the case A has a smaller opening, F, at the inner end of the chamber C to admit of the protrusion of the protection E of the plunger B.

The function and relation of the parts can perhaps be as readily understood from a description of the process involving their use as by any other mode.

D represents the metallic rod preliminarily coiled spirally in any suitable way. For the purpose of this description the case A will be assumed to be in a vertical position. When the spiral D has been brought to a welding heat, it is dropped endwise into the chamber C, resting upon the bottom of the latter, said chamber being of such size that the spiral D will loosely fit the same laterally. The follower B is then forced into the chamber C, the projected lesser end, E, of said follower passing down the central cavity of the spiral D and projecting through the opening F in said chamber, and the lower edge of the larger or compressing portion of the plunger B resting upon the top of the spiral D.

Any suitable force is exerted to drive the follower B into the chamber C, and as the lower end of the spiral D rests on the bottom of the chamber C around the opening F, and as said spiral is held by the walls of said chamber C from lateral displacement, the force applied by the plunger B at the upper edge of said coil exerts uniform compression lineally throughout the entire coil, forcing the contiguous edges of the spiral D into organic union. The plunger B is then withdrawn, and the spiral D, being thoroughly welded in all of its joints, can be removed and finished up by the usual process of internal boring and external turning. The edges of the spiral D are made flat or perpendicular to its longitudinal axis; or, if such edges had a slight convexity at their transverse center, the welding would have its iniative at the transverse center of the wall of the tube, and the tendency be to force out any intervening dirt or dross.

For convenience in removing the tube after welding, the case A may be made in longitudinal halves, held together by encircling rings, and thus be susceptible of being opened for the removal of the spiral D after the latter has been welded.

The opening F in the chamber C and the projection E on the plunger B, I do not deem indispensable, particularly on larger coils, as the walls of the chamber C will sufficiently hold said spiral from lateral movement and keep the same in suitable position; but for smaller coils, and particularly those of thin walls, I think the use of the central projections, E, and the opening F would be preferable. Neither is it essential that the case A should have a bottom integral with itself, as such case may be seated upon any suitable foundation, the latter furnishing the bottom thereof.

The case A may be used in a horizontal as well as in a vertical position, and two plungers, B, entering said case from opposite ends, can be utilized in longer coils and secure greater expedition in the process of welding; also, if desired, the original coil can be made and welded with thicker walls than is intended for the finished product, and then said coil rolled or drawn out in the usual way to any desired length.

As the welding is substantially instantaneous the entire mass and all of the joints are of a uniform heat, and the pressure which produces the welding is exerted equally and uniformly throughout the entire length of the coil, whereby there is secured the two very desirable conditions of uniformity of heat and equality of pressure at every welding locality or joint. Neither is this process of welding limited to cylindrical forms, but the walls of the chamber C can be made rectilinear or in any form to suit any desired exterior conformation of the finished product.

The rapidity and cheapness of the operation and the non-limitation as to the thickness laterally of the coils render such process adaptable to a great variety of purposes. For instance, the largest cannon can be made in this way and the strength and durability requisite can be attained with much less material, consequently with greater lightness of parts, than is required where, as at present, said cannon are constructed of cast-iron or other metal. So, also, these welded coils can be utilized as a strengthening case or band around cannon or rotating shafts—such as shafts on steamers, where great torsional or lateral strain is sometimes experienced. As such torsional or transverse strain would in the case of the employment of the casing welded as aforesaid be in the line of the grain of said case, a comparatively small amount of the latter would afford great and a sufficient degree of resistance. Therefore, while my invention is applicable to the construction of gun-barrels, it is not limited to such, and can be as successfully employed in the construction of armaments of the largest caliber and as strengthening-bands, and wherever a great amount of strength is required transversely.

A series of temporarily-connected rings can be substituted for the spiral D.

What I claim as my invention, and desire to secure by Letters Patent of the United States, is—

1. As a means of laterally welding spirally-coiled metallic strips or bars, the combination of the chamber C, having walls substantially conformable to the exterior of said coil, and the plunger B, adapted to enter and substantially fit said chamber to force the adjacent walls of said spiral into organic union with each other, substantially as shown, and for the purpose described.

2. The combination of the case A, provided with the chamber C and opening F, and the plunger B, provided with the lesser projected end, E, adapted to enter and be held in said opening F, substantially as shown, and for the purpose described.

3. The herein-described process of forming tubes or hollow metallic cylinders by coiling metallic rods or bars spirally, and then placing said spiral while at a welding heat in a chamber conformable to the exterior thereof, and applying pressure to the ends of said spiral, thereby welding the adjacent edges thereof into organic union, substantially as shown, and for the purpose described.

In testimony whereof I affix my signature in presence of two witnesses.

ANDREW J. UPHAM.

Witnesses:
CLAUDE S. UPHAM,
JOHN G. MANAHAN.